US012418143B2

(12) United States Patent
Urtz et al.

(10) Patent No.: US 12,418,143 B2
(45) Date of Patent: Sep. 16, 2025

(54) MECHANISM FOR CONNECTING AND DISCONNECTING CLUSTER RF CONNECTOR

(71) Applicant: John Mezzalingua Associates, LLC, Liverpool, NY (US)

(72) Inventors: Thomas Urtz, Liverpool, NY (US); Jeremy Benn, Liverpool, NY (US); Christopher Natoli, Baldwinsville, NY (US)

(73) Assignee: John Mezzalingua Associates, LLC, Liverpool, NY (US)

(*) Notice: Subject to any disclaimer, the term of this patent is extended or adjusted under 35 U.S.C. 154(b) by 0 days.

(21) Appl. No.: 19/020,907

(22) Filed: Jan. 14, 2025

(65) Prior Publication Data

US 2025/0158328 A1 May 15, 2025

Related U.S. Application Data

(63) Continuation of application No. 17/737,390, filed on May 5, 2022, now Pat. No. 12,294,183.

(Continued)

(51) Int. Cl.
*H01R 13/629* (2006.01)
*H01R 13/518* (2006.01)

(52) U.S. Cl.
CPC ..... *H01R 13/62966* (2013.01); *H01R 13/518* (2013.01)

(58) Field of Classification Search
CPC ............ H01R 13/62966; H01R 13/518; H01R 13/193

(Continued)

(56) References Cited

U.S. PATENT DOCUMENTS 4,884,046 A 11/1989 Spinner
2009/0004906 A1 1/2009 Koch et al.

(Continued)

OTHER PUBLICATIONS

International Search Report and Written Opinion issued for Application No. PCT/US2022/027817, dated Aug. 10, 2022. 7 pages.

(Continued)

*Primary Examiner* — Tulsidas C Patel
*Assistant Examiner* — Jeffrey Mountain
(74) *Attorney, Agent, or Firm* — Meunier Carlin & Curfman LLC

(57) ABSTRACT

A radio frequency (RF) cluster port having a port body including a number of apertures, each configured to hold a corresponding one of a number of RF ports, each RF port having an RF port conductor combination. The port body may include a number of dual-hook structures, each dual hook structure having a upper first hook and a lower second hook, wherein the upper first hook is configured to have a first pressure applied to it by a bearing pin of a cluster connector when the cluster connector engages the number of RF port conductor combinations to a corresponding number of RF connector conductor combinations, and wherein the lower second hook is configured to have a second pressure applied to it by the bearing pin of the cluster connector when the cluster connector disengages the number of RF port conductor combinations from the corresponding number of RF connector conductor combinations.

12 Claims, 12 Drawing Sheets

Related U.S. Application Data

(60) Provisional application No. 63/184,306, filed on May 5, 2021.

(58) Field of Classification Search
USPC .......................................................... 439/157
See application file for complete search history.

(56) References Cited

U.S. PATENT DOCUMENTS

| | | | | |
|---|---|---|---|---|
| 2011/0189874 | A1 | 8/2011 | Weidner | |
| 2011/0287653 | A1 * | 11/2011 | Youtsey ............... | H01R 13/193<br>439/345 |
| 2019/0273332 | A1 | 9/2019 | Youtsey et al. | |
| 2019/0312394 | A1 * | 10/2019 | Paynter .............. | H01R 13/6315 |
| 2020/0313352 | A1 | 10/2020 | Schambach et al. | |
| 2021/0013671 | A1 | 1/2021 | Tie et al. | |

OTHER PUBLICATIONS

Notice of Allowance in connection to U.S. Appl. No. 17/737,390, dated Feb. 5, 2025.
Extended European Search Report, dated Jun. 5, 2025, received in connection with corresponding EP Patent Application No. 22799572.7.

* cited by examiner

MECHANISM FOR CONNECTING AND DISCONNECTING CLUSTER RF CONNECTOR

This application is a continuation of U.S. patent application Ser. No. 17/737,390, filed May 5, 2022, which claims priority to U.S. Provisional Patent Application No. 63/184, 306, filed May 5, 2021, all of which are hereby incorporated by reference in their entirety as if fully set forth herein.

BACKGROUND OF THE INVENTION

Field of the Invention

The present invention relates to wireless communications, and more particularly, to cluster connectors for coupling multiple RF (Radio Frequency) cables to multiport antennas.

Related Art

Modern cellular communications has experienced an explosion in demand for very high data rates per each mobile device (hereinafter user equipment or UE), as well as a massive increase in the number and types of devices. To meet the conflicting challenges of providing high data rates to an increasing number of devices, MIMO (Multiple Input Multiple Output) technologies have been developed to provide multiple simultaneous communication links between a given base station and a UE (e.g., Point-to-Point MIMO) and/or to provide spectrum reuse by enabling an antenna to establish individual narrow beams to individual UEs such that each narrow beam may use the same spectrum resources to multiple UEs simultaneously (e.g., Multi-User MIMO and Massive MIMO).

Each of these approaches requires an individual antenna to have numerous radiators per supported frequency band, and numerous RF ports to provide independent RF signals to different combinations of radiators. Massive MIMO, in particular, requires a large number of RF ports. The need for an increasing number of RF ports is further complicated by the demand to reduce the size of the antenna for dense urban deployments and improved wind loading.

More RF ports may be accommodated through the use of cluster connectors, in which four or more (for example) RF connections may be integrated within a single connector body. However, a complication arises in that each individual RF connection within a cluster connector may require considerable force, both for its connection as well as for its disconnection. The required force for connection/disconnection scales with the number of RF cables in a given cluster connector. The forces required for a single RF connection/disconnection may be as much as 15-20 lbs. Accordingly, the total force required for connection/disconnection for a cluster connector or many RF connections may be considerable. Further, each RF connection must support 30+ GHz frequencies and be free of problems such as passive intermodulation distortion (PIM). This requires a precise RF engagement mechanism that may be susceptible to damage if excessive forces, such as lateral or torsional forces, are applied during insertion and removal of the cluster connector. Additionally, in the case of a large number of RF ports (e.g., for a Massive MIMO antenna), it may be necessary to have multiple cluster connector ports disposed on the antenna in close proximity, thereby limiting access to each individual cluster connector for insertion and removal. This can be further complicated by the need to connect and disconnect these cluster connectors in the field, which may involve being at the top of a cell tower.

Accordingly, there is a need for an RF cluster connector mechanism that provides for easy, consistent, and reliable connection and disconnection of its constituent RF conductors, whereby the cluster connector may be in close proximity to other cluster connectors on the antenna, and whereby the antenna may be mounted at the top of a cell tower.

BRIEF SUMMARY OF THE DISCLOSURE

Accordingly, the present invention is directed to a Mechanism for Connecting and Disconnecting Cluster RF Connector that obviates one or more of the problems due to limitations and disadvantages of the related art.

An aspect of the present disclosure involves an RF cluster connector. The connector comprises a connector body having a plurality of apertures configured to hold a corresponding one of a plurality of RF connector bodies, each RF connector body having a RF connector conductor combination; a plurality of lever arms rotatably coupled to the connector body at a corresponding pivot pin disposed on the connector body; and a plurality of draw arms, each rotatably coupled to a corresponding lever arm by an arm link pin at a proximal end, each of the plurality arms having a bearing pin disposed on a distal end, wherein each of the plurality of bearing pins are configured to engage with a corresponding dual hook structure on a cluster port, each dual hook structure having a upper first hook and a lower second hook, wherein each bearing pin is configured to press against the upper first hook when engaging the plurality of RF connector conductor combinations to their corresponding RF port conductor combinations, and wherein each bearing pin is configured to press against the lower second hook when disengaging the plurality of RF connector conductor combinations from their corresponding RF port conductor combinations.

Another aspect of the present disclosure involves an RF cluster port having a port body. The port body comprises a plurality of apertures configured to hold a corresponding one of a plurality of RF port conductor combinations; and a plurality of dual-hook structures, each dual hook structure having a upper first hook and a lower second hook, wherein the upper first hook is configured to have a first pressure applied to it by a corresponding bearing pin of a cluster connector when engaging the plurality of RF port conductor combinations to a corresponding plurality of RF connector conductor combinations, and wherein the lower second hook is configured to have a second pressure applied to it by the corresponding bearing pin of the cluster connector when disengaging the plurality of RF port conductor combinations from the corresponding plurality of RF connector conductor combinations.

BRIEF DESCRIPTION OF THE DRAWINGS

The accompanying figures, which are incorporated herein and form part of the specification, illustrate a mechanism for connecting and disconnecting a cluster RF connector. Together with the description, the figures further serve to explain the principles of the mechanism for connecting and disconnecting a cluster RF connector described herein and thereby enable a person skilled in the pertinent art to make and use the mechanism for connecting and disconnecting a cluster RF connector.

DESCRIPTION OF EXEMPLARY EMBODIMENTS

Figure 1:
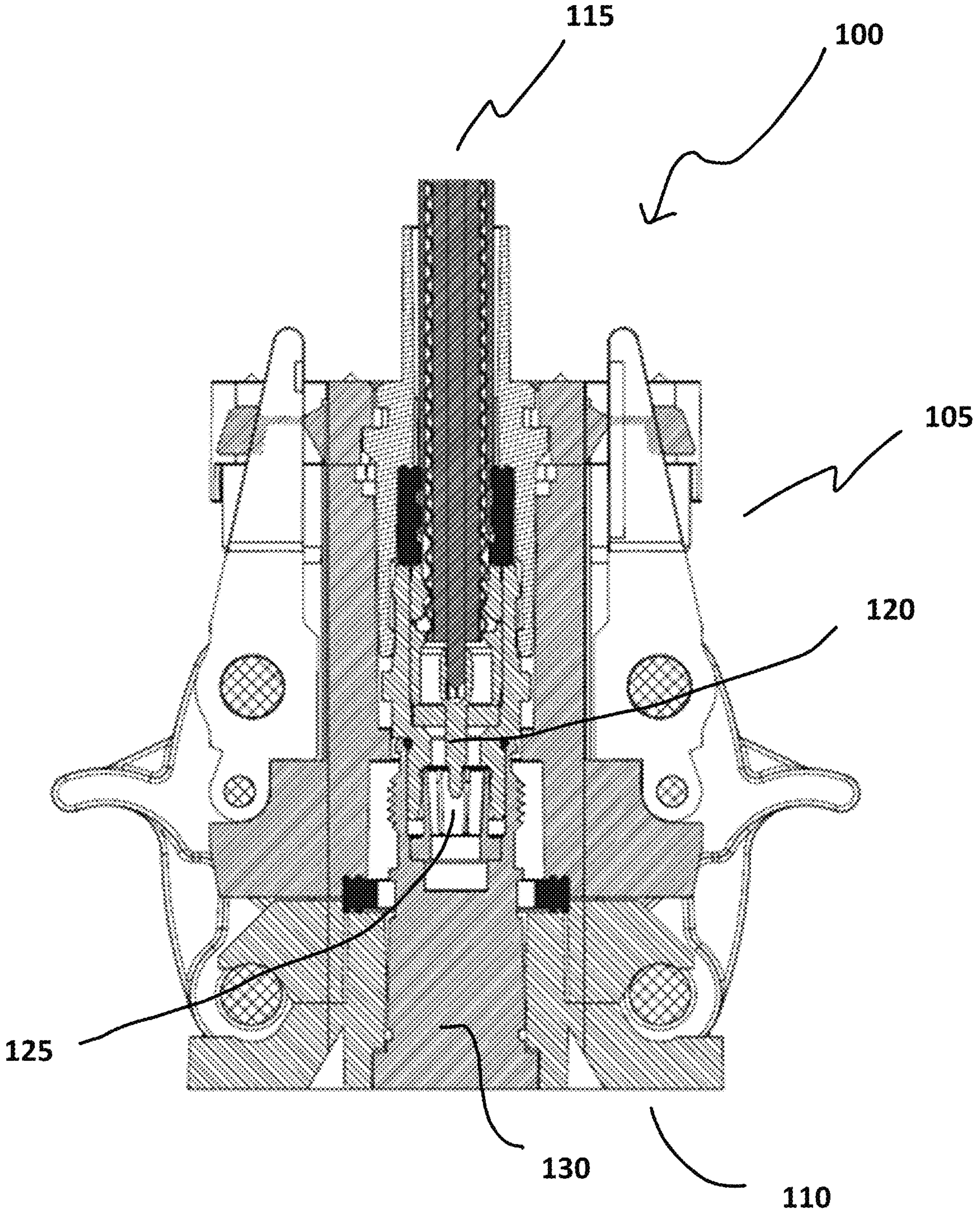
FIG. 1 is a cutaway view of an exemplary cluster connector fully engaged with a cluster port according to the disclosure.

Reference will now be made in detail to embodiments of the mechanism for connecting and disconnecting a cluster RF connector with reference to the accompanying figures. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents FIG. 1 is a cutaway view of a configuration 100 of an exemplary cluster connector 105 fully engaged with a cluster port 110 according to the disclosure. As illustrated, an RF cable 115, which is mechanically engaged with the body of cluster connector 105 such that connector center conductor 120 is mechanically and electrically coupled with center conductor receptacle 125 of RF port 130 within cluster port 110.

Although FIGS. 1-10 illustrate a single RF connection between RF cable 115 and RF port 130 within cluster connector 105 and cluster port 110, it will be understood that there may be multiple parallel RF connections (RF cable 115 and RF port 130), and that one is shown for convenience of illustration. In an exemplary embodiment, cluster connector 105 and cluster port 110 may have four or five counterpart RF connections. Some of these RF connections may be identical (e.g., all having the same RF cable 115, center conductor 120, and RF port 130). Alternatively, some of them may have different RF cable types (e.g., conductor diameters), and one or more may have a non-RF cable connection and may instead have a cable intended for digital communication or DC electrical power. Further, one or more may instead have a fiber optic cable, in which case the connection may be a fiber optic interface. It will be understood that such variations are possible and within the scope of the disclosure.

Figure 2:
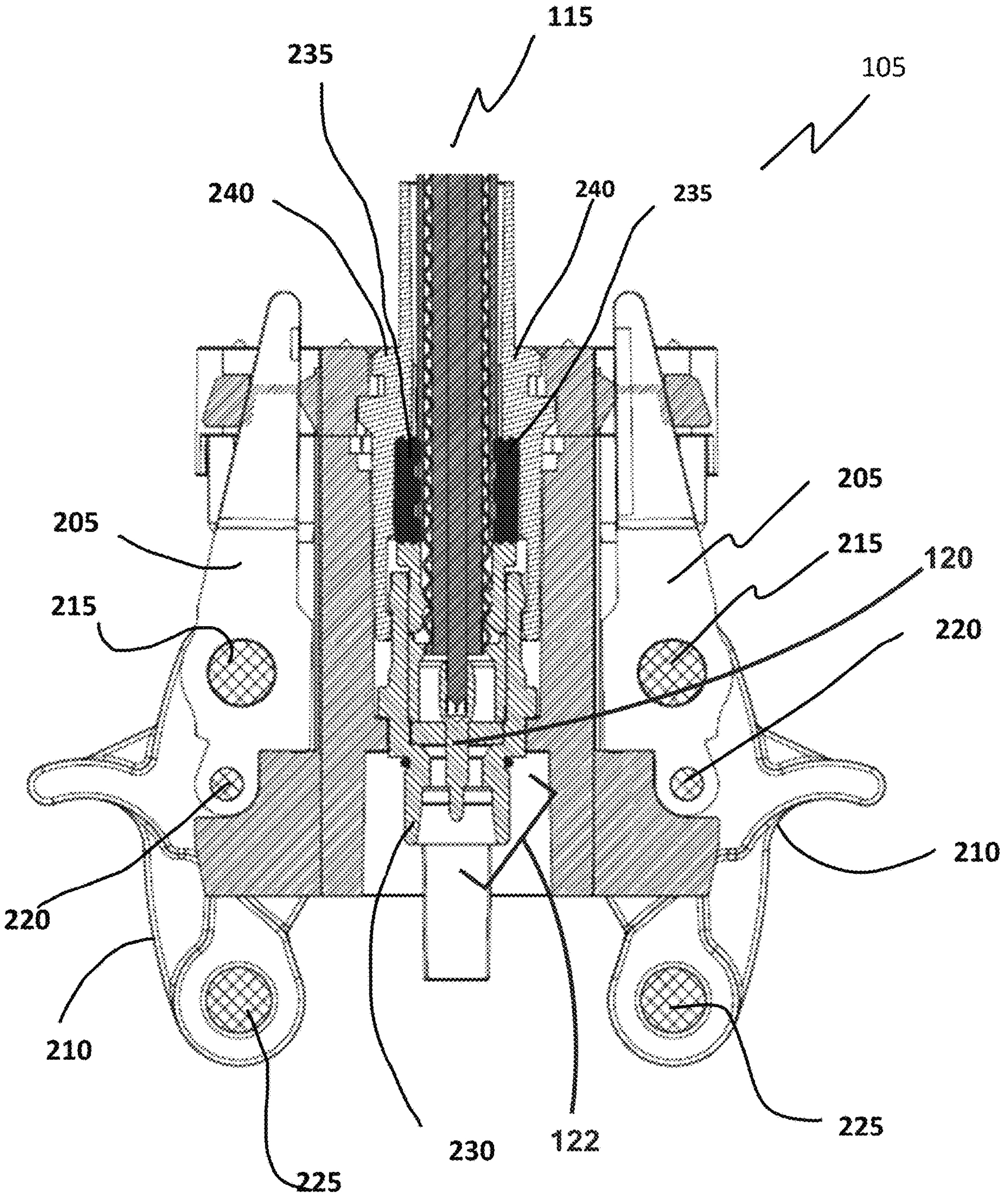
FIG. 2 is a cutaway view of an exemplary cluster connector with its clamp mechanism in the engaged position, according to the disclosure.

FIG. 2 is a cutaway view of an exemplary cluster connector 105 with its clamp mechanism in the engaged position, according to the disclosure. The clamp mechanism of cluster connector 105 includes two lever arms 205, each of which rotatably engage with the body of cluster connector 105 at pivot point 220. Each lever arm 205 has an arm link pin 215, which engages lever arm 205 with a corresponding draw arm 210 such that the lever arm 205 and draw arm 210 may rotate relative to each other. Each arm link pin 215 may include a torsional biasing spring (not shown) that biases the angular orientation of the corresponding draw arm 210 toward the center axis of cluster connector 105. Each draw arm 210 has a bearing pin 225, which is configured to engage with the cluster port 110, which is described further below. Further, given that lever arm 205 is configured to rotate around pivot point 220, a combination of rotations around pivot point 220 and arm link pin 215 may enable draw arm 210 to translate as well as rotate, as is described further below.

The body of cluster connector 105 may mechanically engage with an RF connector body 240, which may be held in place within the body of cluster connector 105 by a connector gasket 235. RF connector body 240 may include an outer conductor 230, which surrounds center conductor 120. The center conductor 120 is configured to mechanically and electrically couple with the center conductor receptacle 125 of cluster port 110, and the outer conductor 230 is configured to mechanically and electrically couple with the outer conductor interface 325 of cluster port 110. As used herein, the center conductor 120 and outer conductor 230 may be referred to as an RF connector conductor combination 122, and the center conductor receptacle 125 and outer conductor interface 325 may be referred to as an RF port conductor combination. Further as stated above, cluster connector 105 may have a plurality of RF connector bodies 240, each coupled to a corresponding RF cable 115.

Figure 3:
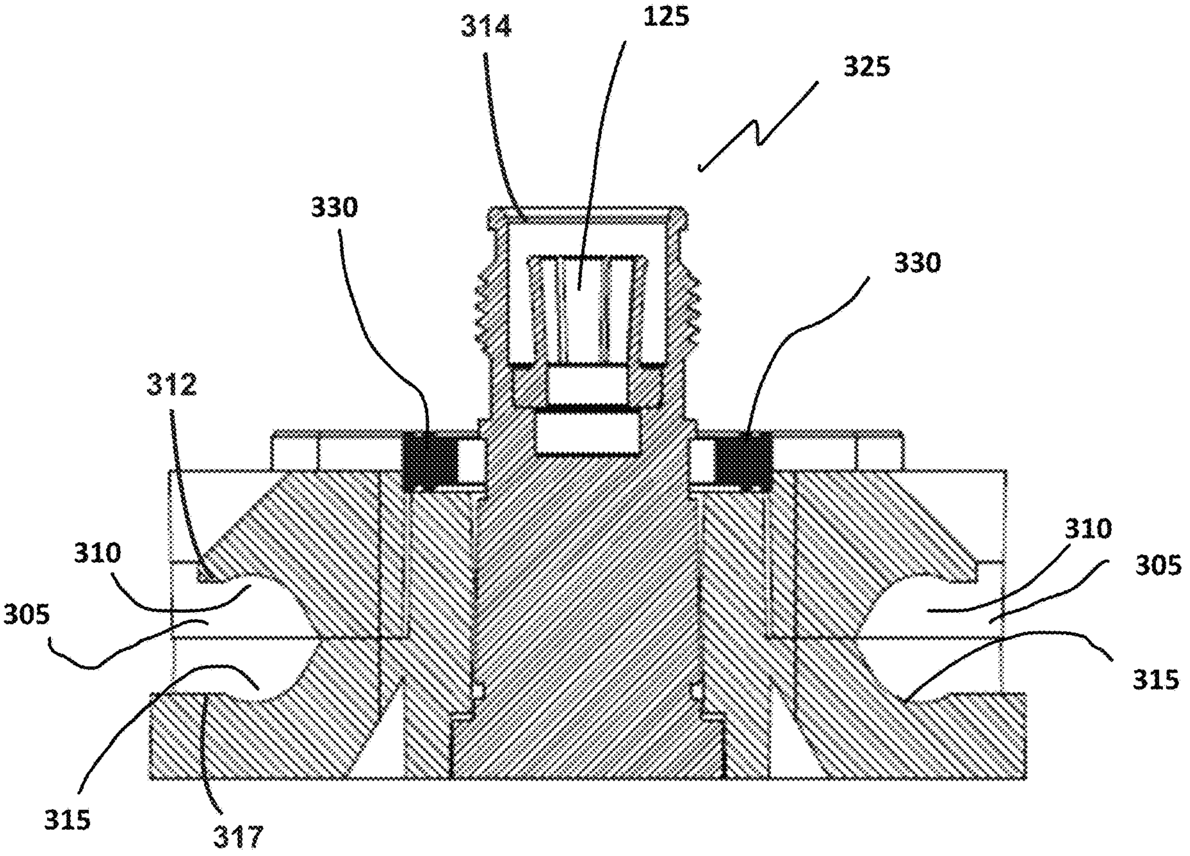
FIG. 3 is a cutaway view of an exemplary cluster port according to the disclosure.
Figure 11:
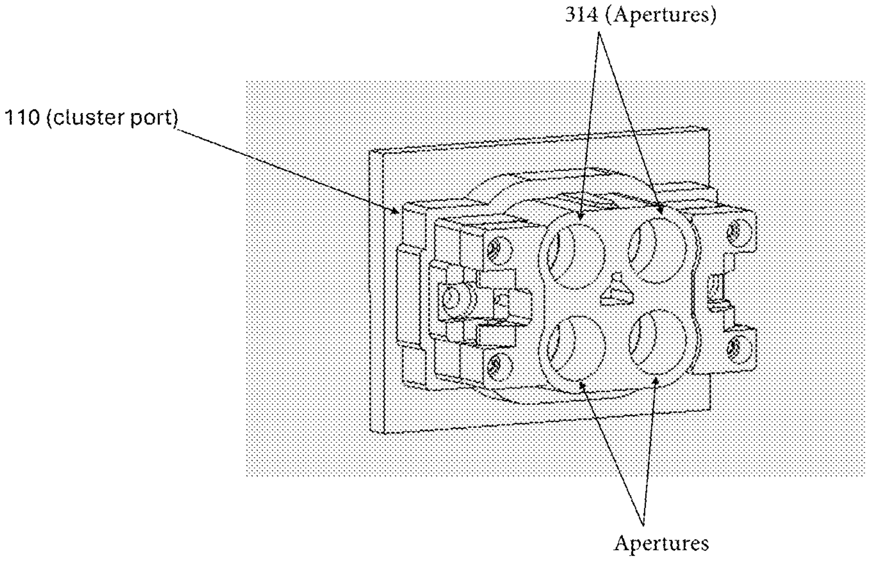
FIG. 11 illustrates a cluster port having a number of apertures.
Figure 12:
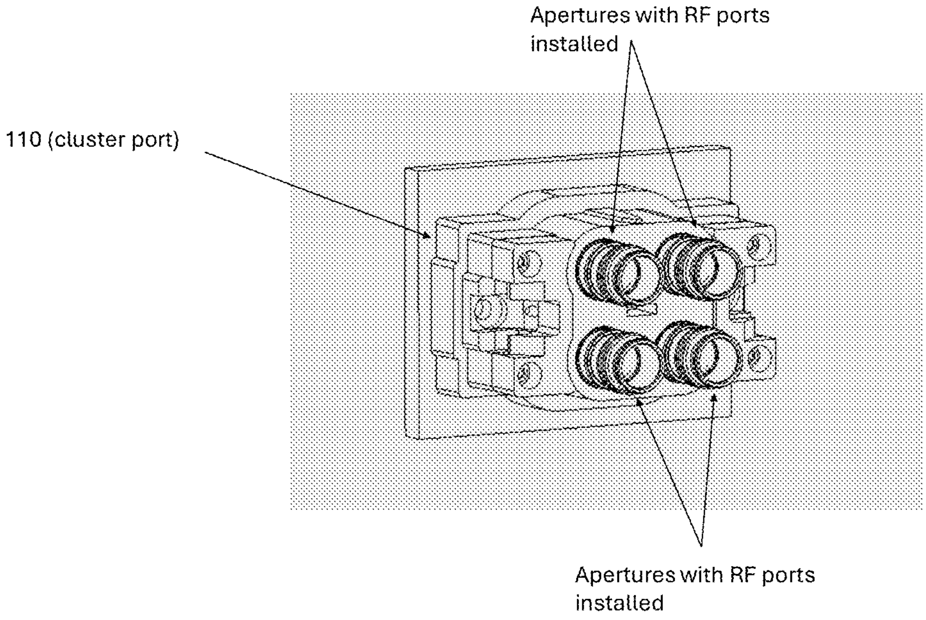
FIG. 12 illustrates a cluster port having a number of apertures with RF ports installed.

FIG. 3 is a cutaway view of an exemplary cluster port 110 according to the disclosure. Cluster port 110 has a port body that has a plurality of apertures 314 configured to hold a corresponding plurality of RF ports 130 that electrically and mechanically couple with the corresponding plurality of RF connector conductor combinations. Apertures 314 can be seen in FIG. 11 (without RF ports installed) and in FIG. 12 (with RF ports installed). Cluster port 110 has an interface gasket 330, which may be in the form of a ring and is configured to compress as it engages with cluster connector 105 when being coupled and decoupled. Cluster port 110 has a plurality of dual hook structure 305, each corresponding to a draw arm 210, and each having an upper first hook 310 and a lower second hook 315. Upper first hook 310 includes upper lip 312 and lower second hook 315 includes lower lip 317. Each dual hook structure 305 is configured to engage with a corresponding bearing pin 225 in a manner described further below.

Lever arms 205, draw arms 210, and dual hook structures 305 may be formed of metal or polymer.

Figure 4:
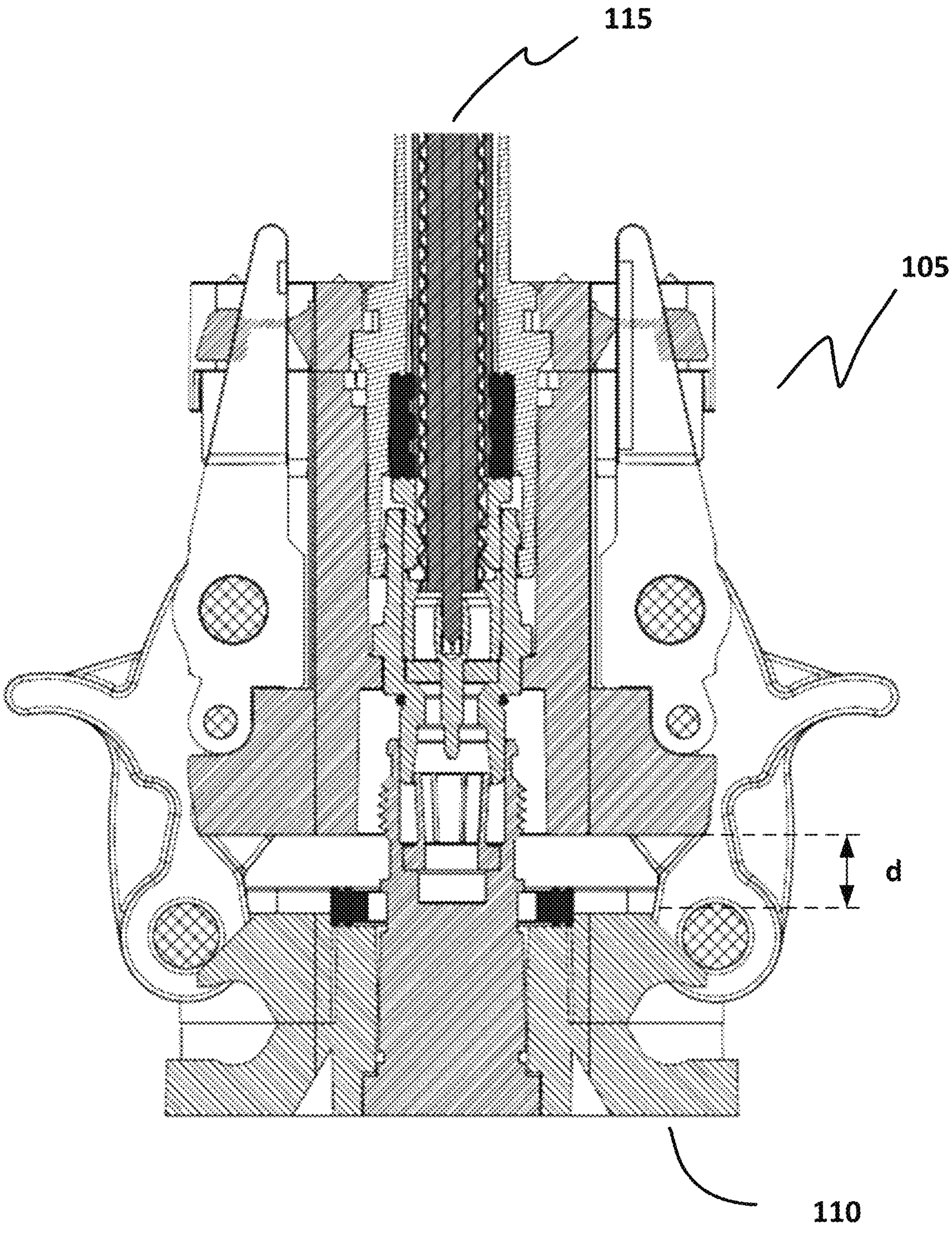
FIG. 4 is a cutaway view of an exemplary cluster connector in an initial (first) position of a sequence for coupling to an exemplary cluster port.

FIG. 4 is a cutaway view of cluster connector 105 in an initial (first) position of a sequence for coupling with cluster port 110. As illustrated, the body of cluster connector 105 is brought into contact with the cluster port 110 such that the male interface of RF connector body 240 is aligned with outer conductor interface 325. At this stage, the bearing pins of draw arms 210 may be in contact with the body of cluster port 110 above respective dual hook structures 305, and the cluster connector 105 may have a remaining translation distance d to be fully engaged with cluster port 110.

Figure 5:
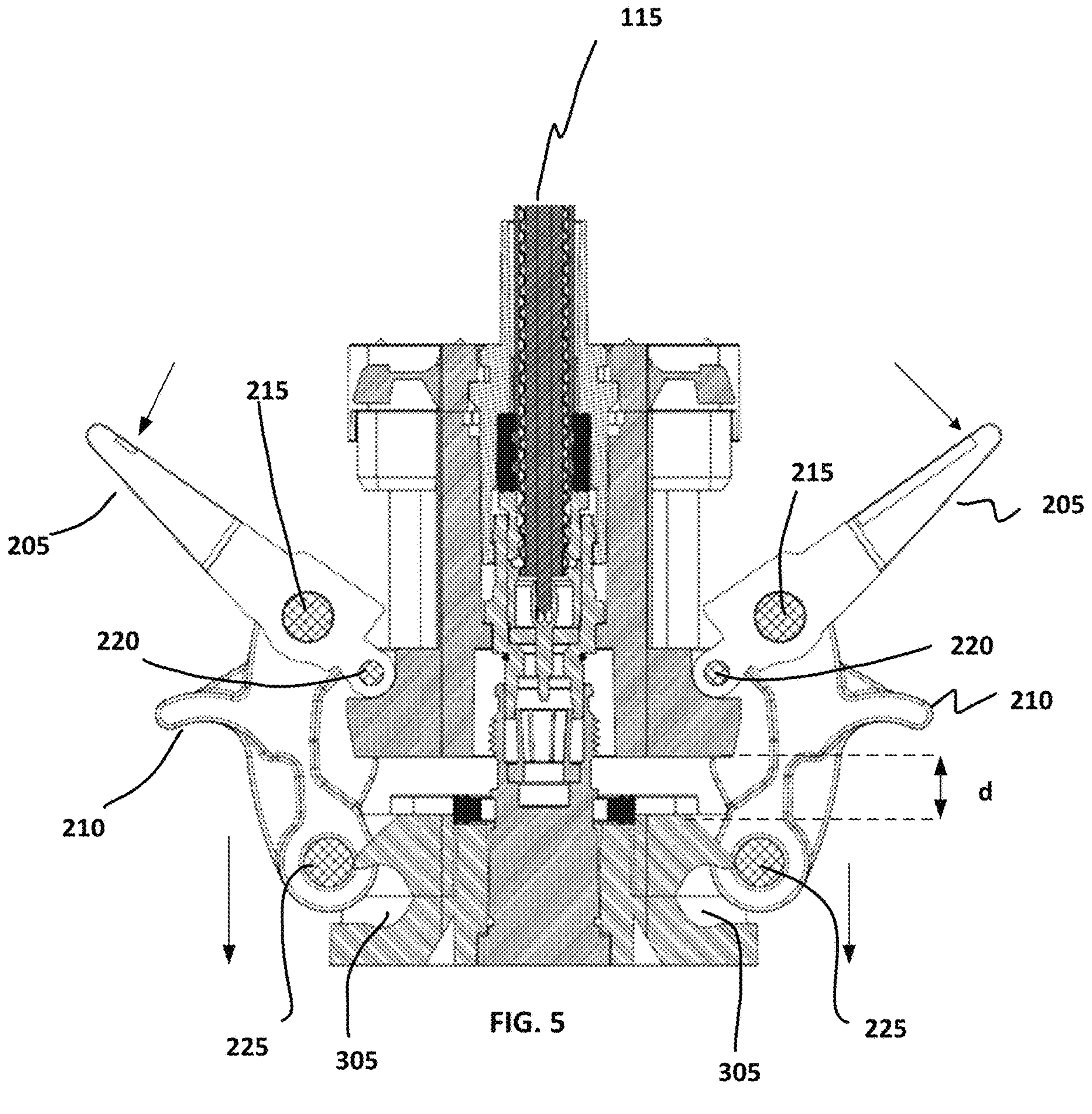
FIG. 5 is a cutaway view of an exemplary cluster connector in a second position of a sequence for coupling to an exemplary cluster port.

FIG. 5 is a cutaway view of cluster connector 105 in a second position of a sequence for coupling to cluster port 110. The illustrations of FIGS. 4-8 may be snapshots of a single motion made by a technician (not shown) who—at the stage depicted in FIG. 5—is rotating lever arms 205 outward from the center axis of cluster connector 105. In doing so, the lever arms 205 rotate around their respective pivot pins 220 and thus push draw arms 210 downward as they rotate relative to the lever arms 205 around respective arm link pins 215. As the draw arms 210 rotate and translate downward, the bearing pins 225 translate along the upper surface of the dual hook structures 305. Due to the torsional bias provided at arm link pin 215, bearing pins 225 are drawn toward the center axis of cluster connector 105, and thus also toward the center axis of cluster port 110. Further, as illustrated, at the stage depicted in FIG. 5, the remaining translation distance d is reduced as the cluster connector 105 and cluster port 110 come together.

Figure 6:
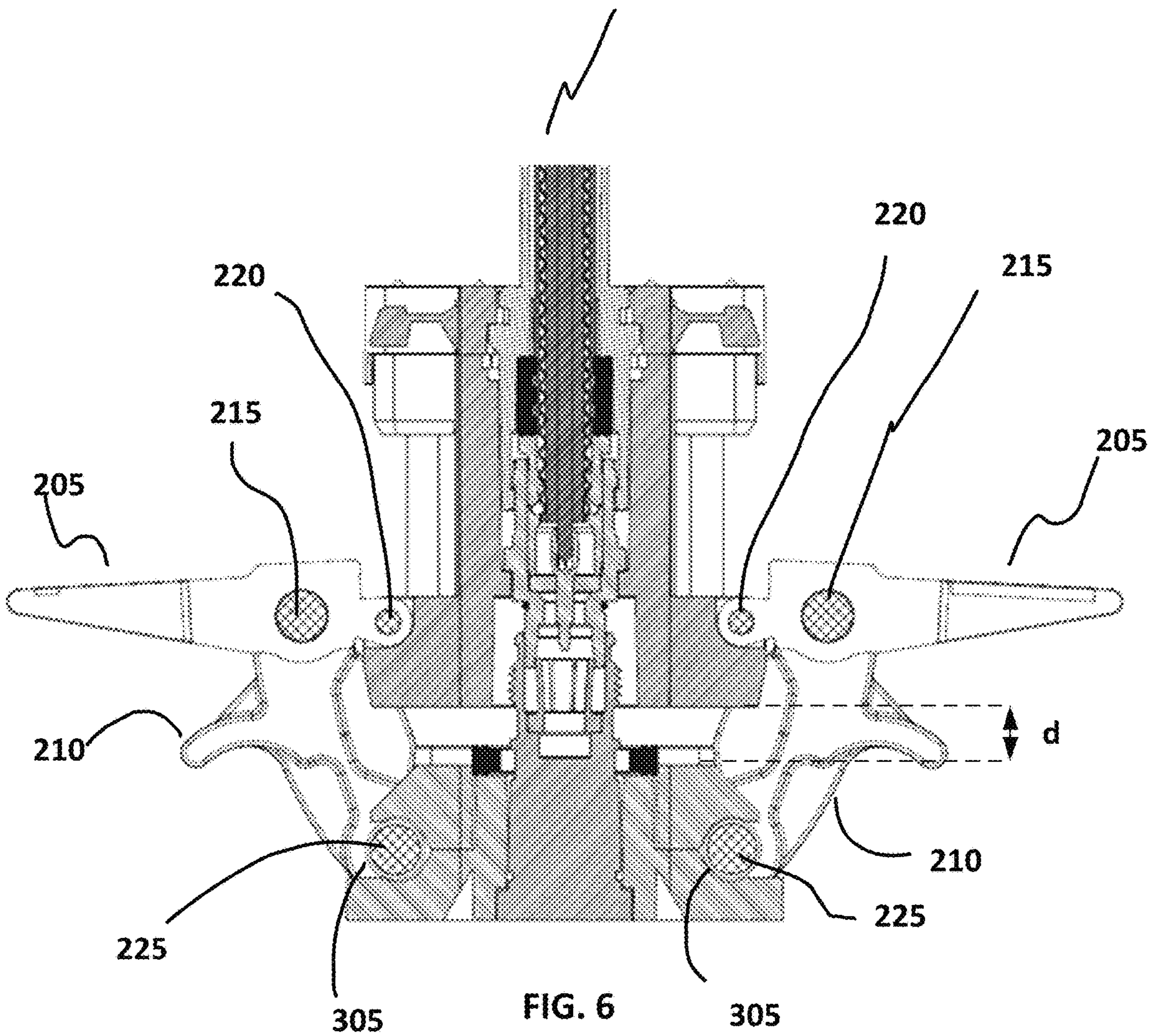
FIG. 6 is a cutaway view of an exemplary cluster connector in a third position of a sequence for coupling to an exemplary cluster port.

FIG. 6 is a cutaway view of cluster connector 105 in a third position of a sequence for coupling to cluster port 110. At this stage, the technician is continuing to rotate downward lever arms 205, which are illustrated at approximately 90 degrees from a center axis of the cluster connector 105 and cluster port 110. With the continued rotation of lever arms 205, draw arms 210 have translated downward to where their respective bearing pins 225 have entered the apertures of dual hook structures 305, being drawn in by the torsional bias provided at arm link pin 215.

Figure 7:
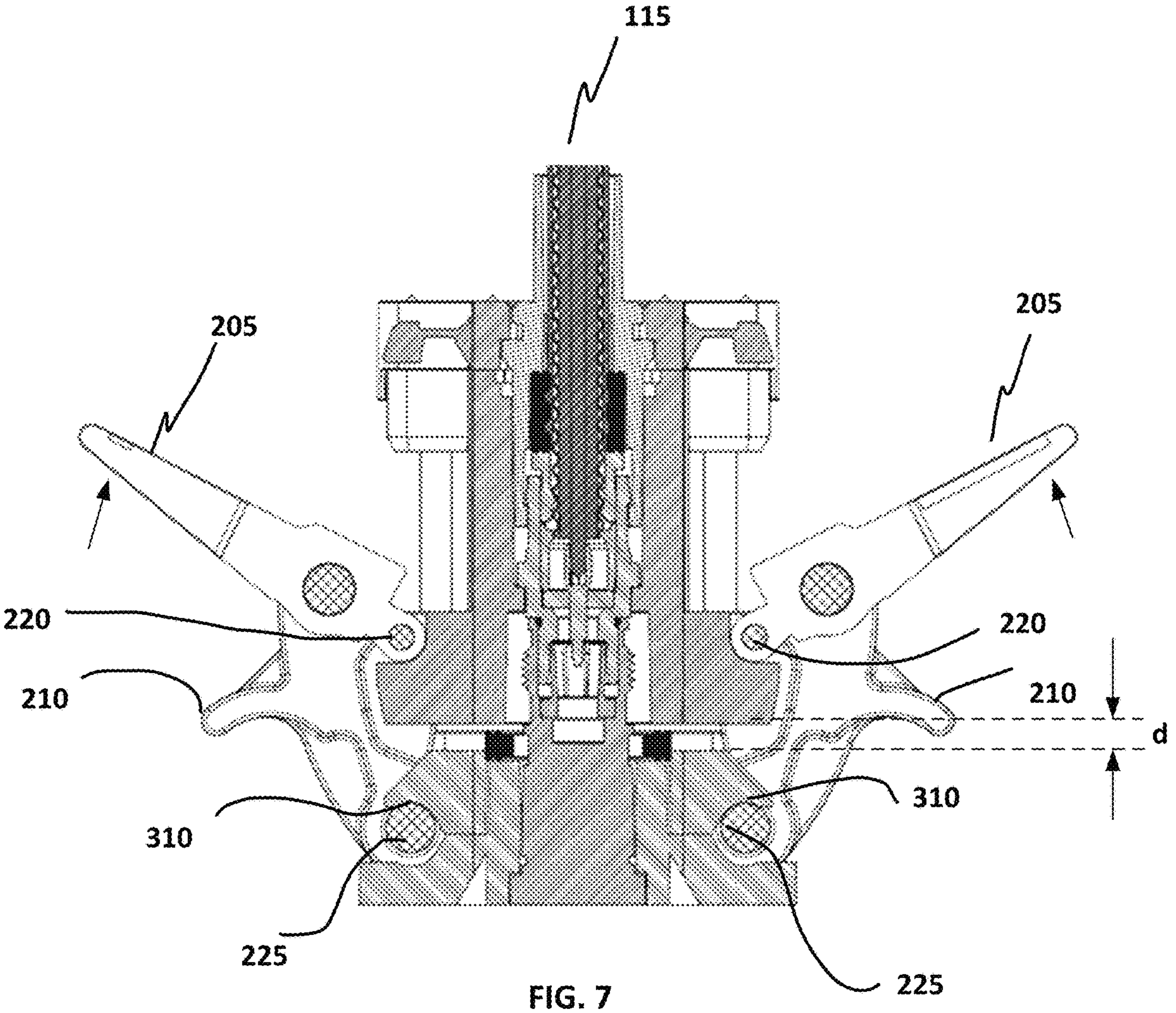
FIG. 7 is a cutaway view of an exemplary cluster connector in a fourth position of a sequence for coupling to an exemplary cluster port.

FIG. 7 is a cutaway view of cluster connector 105 in a fourth position of a sequence for coupling with exemplary cluster port 110. As with the FIGS. 5 and 6, this illustration is a snapshot of a continuous motion made by an installing technician. Here, the technician is rotating lever arms 205 upward and toward the center axis of cluster connector 105. As each lever arm 205 rotates around its respective arm link pin 215, corresponding draw arm 210 is drawn upward such that its bearing pin 225 translated upward to where it engages with and applies pressure to upper first hook 310. With this established, any further upward rotation of lever arms 205 causes the body of cluster connector 105 to translate downward, thereby causing outer conductor 230 to engage outer conductor interface 325, and causing center conductor 120 to engage center conductor receptacle 125.

Figure 8:
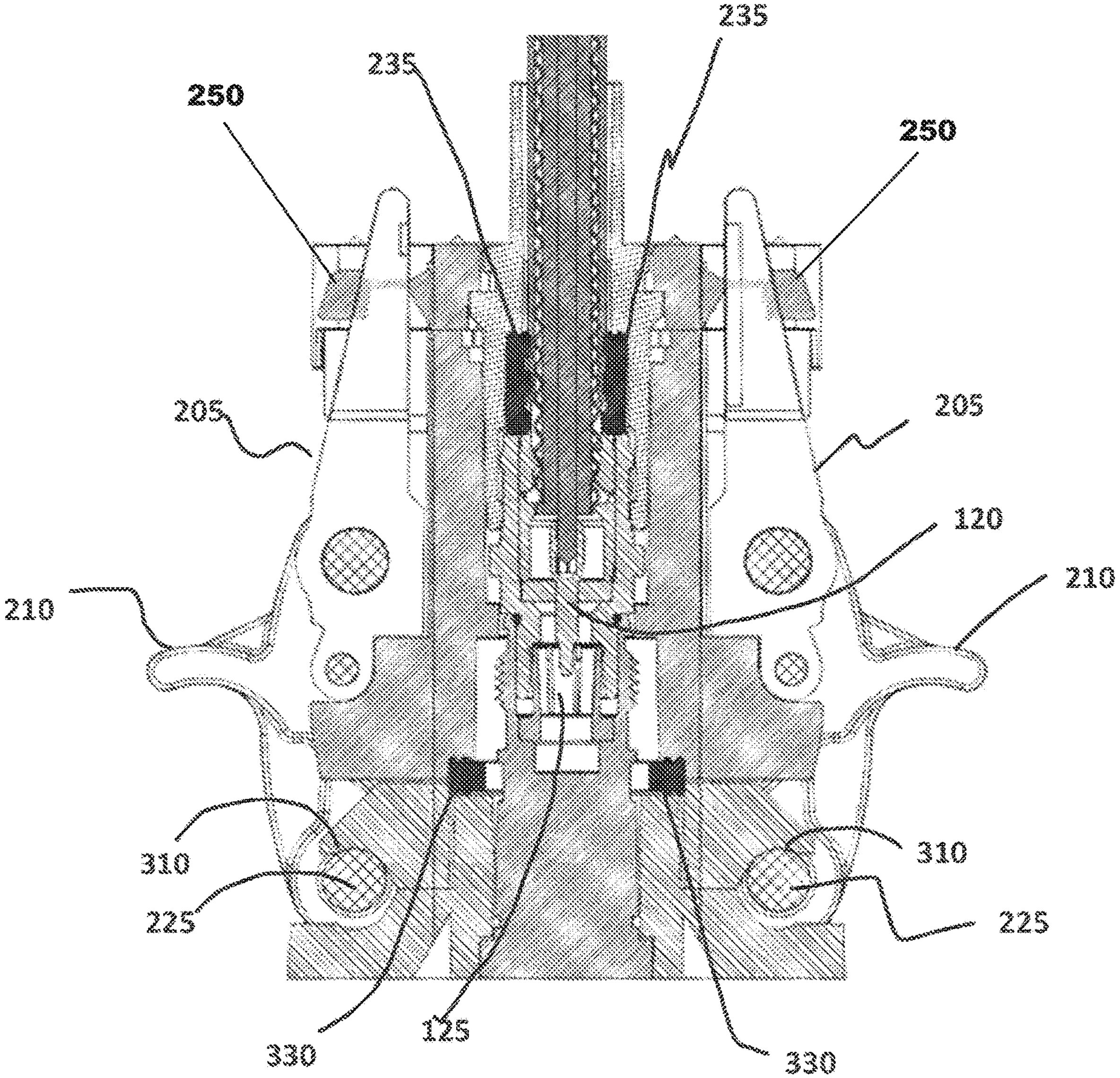
FIG. 8 is a cutaway view of an exemplary cluster connector in a final engaged position of a sequence for coupling to an exemplary cluster port.

FIG. 8 is a cutaway view of exemplary cluster connector 105 in a final engaged position of a sequence for coupling to exemplary cluster port 110. As illustrated, the technician has rotated lever arms 205 inward toward the center axis of cluster connector 105 until they have reached their respective resting position. The body of cluster connector 105 may have a pair of “hammer head” style tabs 250 into which the end of the lever arm 205 snaps into place. Each lever arm 205 may also have a cam structure integrated into pivot pin 220 that requires a force to be applied manually to get the lever arm 205 to be initially rotated from its neutral position illustrated in FIGS. 1, 2, 4, and 8. At this state, the RF connector body 240 is fully engaged with RF port 130. In other words, the RF connector conductor combination has fully engaged with its corresponding RF port conductor combination.

Figure 9:
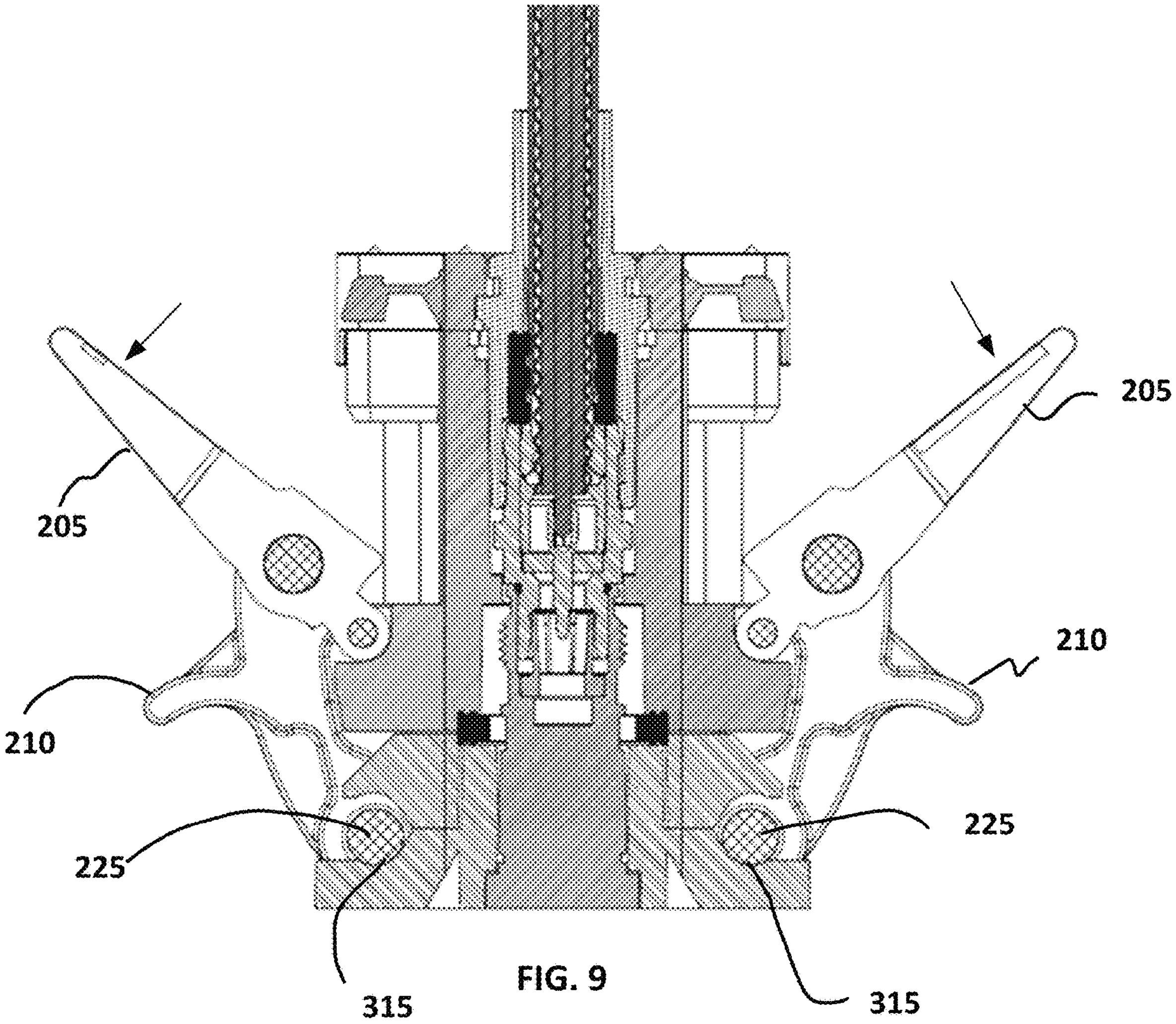
FIG. 9 is a cutaway view of an exemplary cluster connector in a first position of a sequence for decoupling from an exemplary cluster port.

FIG. 9 is a cutaway view of cluster connector 105 in a first position of a sequence for decoupling from cluster port 110. As illustrated, the technician rotates lever arms 205 downward and away from the center axis of cluster connector 105. In response, draw arms 210 rotate in turn around arm link pin 215 and translate toward cluster port 110. This downward translation causes bearing pins of draw arms 210 to press against lower second hooks 315 of dual hook structures 305 within the body of cluster port 110. This downward force against lower second hooks 315 causes cluster connector 105 to translate upward from cluster port 110, thereby causing center conductor 120 to begin to decouple from center conductor receptacle 125 and outer conductor 230 to begin to decouple from outer conductor interface 325.

Figure 10:
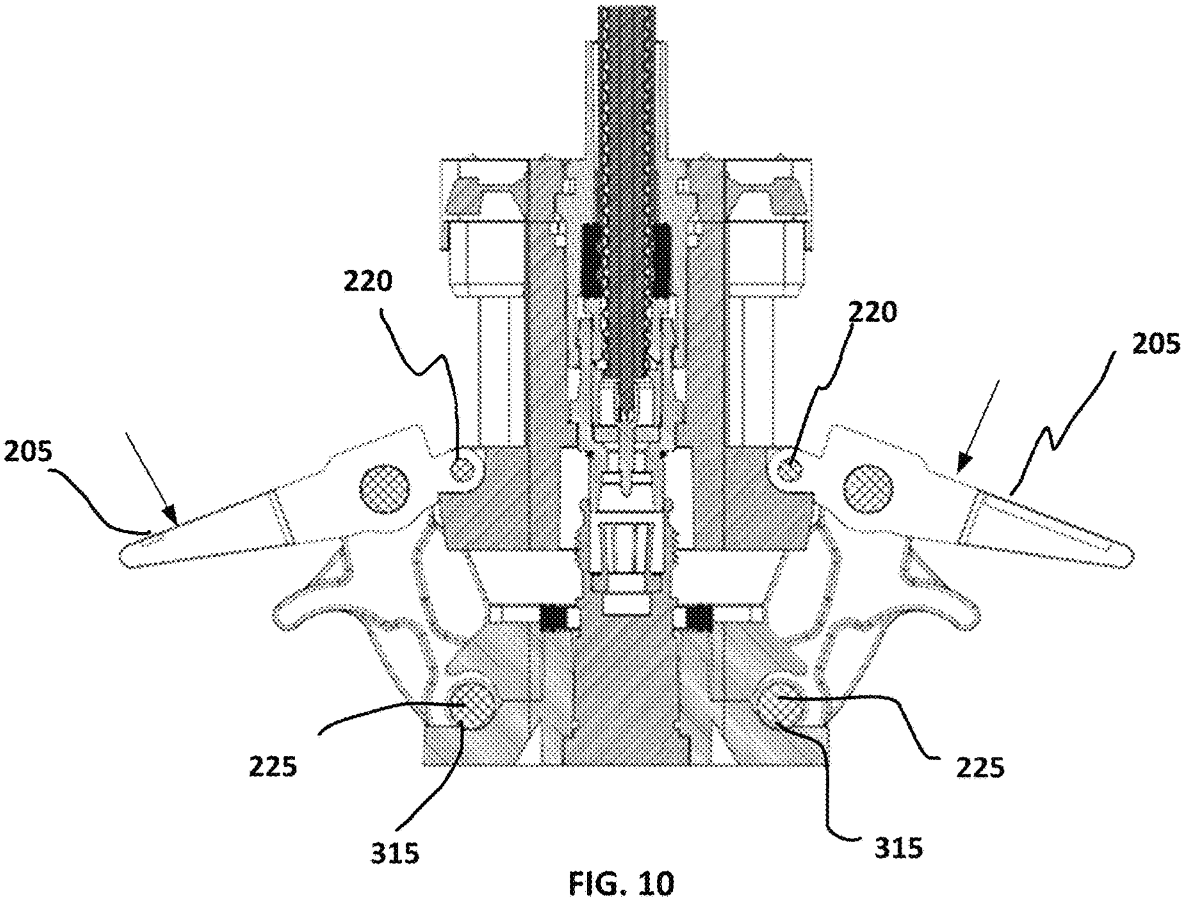
FIG. 10 is a cutaway view of an exemplary cluster connector in a second position of a sequence for decoupling from an exemplary cluster port.

FIG. 10 is a cutaway view of cluster connector 105 in a second position of a sequence for decoupling from cluster port 110. As illustrated, the technician continues to rotate the lever arms 205 downward, causing the bearing pins 225 to maintain pressure on lower second hooks 315, thereby causing center conductor 120 to fully decouple from center conductor receptacle 125 and outer conductor 230 to fully decouple from outer conductor interface 325.

Although not illustrated, in the final motion, after center conductor 120 has decoupled from center conductor receptacle 125 and outer conductor 230 has decoupled from outer conductor interface 325, the technician may rotate lever arms 205 upward to return them to the positions illustrated in FIG. 2.

Although the term “position” is used with reference to the drawings, it will be understood that these images are snapshots of a fluid motion, and that the lever arms 105 (for example) need not be held or maintained in the positions illustrated in FIGS. 5, 6, 7, 9, and 10.

In an exemplary embodiment, cluster connector 105 and cluster port 110 may support four 2.2-5 connectors. Each of these connectors may require 15-20 lbs. of force to engage and disengage. Accordingly, the total force required to engage and disengage cluster connector 105 and cluster port 110 may be 60-80 lbs.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. An RF cluster port having a port body, the port body comprising:

a plurality of apertures, each configured to hold a corresponding one of a plurality of RF (Radio Frequency) ports, each RF port having an RF port conductor combination comprising (i) a center conductor receptacle and (ii) an outer conductor interface; and a plurality of dual-hook structures, each dual hook structure having a upper first hook and a lower second hook, wherein the upper first hook is configured to have a first pressure applied to it by a bearing pin of a cluster connector when the cluster connector engages the plurality of RF port conductor combinations to a corresponding plurality of RF connector conductor combinations, and wherein the lower second hook is configured to have a second pressure applied to it by the bearing pin of the cluster connector when the cluster connector disengages the plurality of RF port conductor combinations from the corresponding plurality of RF connector conductor combinations.

2. The RF cluster port of claim 1, wherein the upper first hook comprises an upper lip, and the lower second hook comprises a lower lip, wherein the lower lip extends further from the RF port than the upper lip.

3. The RF cluster port of claim 1, wherein the plurality of RF port conductor combinations are configured to engage a single RF cable type.

4. The RF cluster port of claim 1, wherein the plurality of RF port conductor combinations are configured to support different cable types.

5. An RF cluster port having a port body, the port body comprising:

a plurality of apertures, each configured to hold a corresponding one of a plurality of RF (Radio Frequency) ports, each RF port having an RF port conductor combination;

a plurality of dual-hook structures, each dual hook structure having a upper first hook and a lower second hook, wherein the upper first hook is configured to have a first pressure applied to it by a bearing pin of a cluster connector when the cluster connector engages the plurality of RF port conductor combinations to a corresponding plurality of RF connector conductor combinations, and wherein the lower second hook is configured to have a second pressure applied to it by the bearing pin of the cluster connector when the cluster connector disengages the plurality of RF port conductor combinations from the corresponding plurality of RF connector conductor combinations; and a gasket disposed on the port body, wherein the gasket is configured to compress when the cluster connector engages the plurality of RF port conductor combinations to the corresponding plurality of RF connector conductor combinations.

6. The RF cluster port of claim 5, wherein the upper first hook comprises an upper lip, and the lower second hook comprises a lower lip, wherein the lower lip extends further from the RF port than the upper lip.

7. The RF cluster port of claim 5, wherein the plurality of RF port conductor combinations are configured to engage a single RF cable type.

8. The RF cluster port of claim 5, wherein the plurality of RF port conductor combinations are configured to support different cable types.

9. An RF cluster port having a port body, the port body comprising:

a plurality of apertures, each configured to hold a corresponding one of a plurality of RF (Radio Frequency) ports, each RF port having an RF port conductor combination;

a plurality of dual-hook structures, each dual hook structure having a upper first hook and a lower second hook, wherein the upper first hook is configured to have a first pressure applied to it by a bearing pin of a cluster connector when the cluster connector engages the plurality of RF port conductor combinations to a corresponding plurality of RF connector conductor combinations, and wherein the lower second hook is configured to have a second pressure applied to it by the bearing pin of the cluster connector when the cluster connector disengages the plurality of RF port conductor combinations from the corresponding plurality of RF connector conductor combinations; and wherein each of the dual-hook structures is configured to have the bearing pin translate along its outer surface when the cluster connector engages the RF cluster port and before the bearing pin applies the first pressure to its upper first hook.

10. The RF cluster port of claim 9, wherein the upper first hook comprises an upper lip, and the lower second hook comprises a lower lip, wherein the lower lip extends further from the RF port than the upper lip.

11. The RF cluster port of claim 9, wherein the plurality of RF port conductor combinations are configured to engage a single RF cable type.

12. The RF cluster port of claim 9, wherein the plurality of RF port conductor combinations are configured to support different cable types.

* * * * *